(12) United States Patent
Lo et al.

(10) Patent No.: US 10,948,765 B2
(45) Date of Patent: Mar. 16, 2021

(54) DISPLAY DEVICE

(71) Applicant: Coretronic Corporation, Hsin-Chu (TW)

(72) Inventors: Yi-Chien Lo, Hsin-Chu (TW); Hsin-Hsiang Lo, Hsin-Chu (TW); Chuan-Chung Chang, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/264,709

(22) Filed: Feb. 1, 2019

(65) Prior Publication Data

US 2019/0250456 A1 Aug. 15, 2019

(30) Foreign Application Priority Data

Feb. 9, 2018 (CN) .......................... 201810133327.4

(51) Int. Cl.
*G02F 1/1335* (2006.01)
*G02F 1/1362* (2006.01)
(Continued)

(52) U.S. Cl.
CPC ... *G02F 1/133528* (2013.01); *G02B 26/0833* (2013.01); *G02B 27/0172* (2013.01);
(Continued)

(58) Field of Classification Search
CPC ...................... G02F 1/133526; G02B 26/0833
(Continued)

(56) References Cited

U.S. PATENT DOCUMENTS 5,083,854 A * 1/1992 Zampolin ......... G02F 1/133526
349/110
5,475,513 A 12/1995 Nakanishi et al.
(Continued)

FOREIGN PATENT DOCUMENTS

CN 1139761 A 1/1997
CN 1159606 A 9/1997
(Continued)

OTHER PUBLICATIONS

Hong Hua et al., A 3D integral imaging optical see-through head-mounted display, Optics Express, Jun. 2, 2014, vol. 22, No. 11, Optical Society of America.
(Continued)

*Primary Examiner* — James A Dudek (57) ABSTRACT

A display device includes a light source, a light-directing element, a first lens, a microlens array, and a reflective display element. The light-directing element is adapted to project a lighting beam provided by the light source toward an incident direction. The first lens is configured to receive the lighting beam projected by the light-directing element and project the lighting beam toward the incident direction. The first lens is located between the microlens array and the light-directing element. The micro-image units of the reflective display element correspond to the microlenses of the microlens array respectively. Each micro-image unit converts the lighting beam into an sub-image beam and reflect the sub-image beam to the microlens array. Each sub-image beam is projected to the first lens by the corresponding microlens, and the sub-image beams pass through the light-directing element and transmit to an aperture to form an image beam.

17 Claims, 11 Drawing Sheets

(51) Int. Cl.
  *G02B 26/08* (2006.01)
  *G02B 27/01* (2006.01)
  *G02B 30/00* (2020.01)

(52) U.S. Cl.
  CPC .. *G02F 1/133526* (2013.01); *G02F 1/136277* (2013.01); *G02B 30/00* (2020.01); *G02B 2027/0134* (2013.01); *G02F 1/13355* (2021.01); *G02F 2203/02* (2013.01)

(58) Field of Classification Search
  USPC .......................................................... 349/7
  See application file for complete search history.

(56) References Cited

U.S. PATENT DOCUMENTS

| | | | |
|---|---|---|---|
| 5,777,781 A * | 7/1998 | Nam | G02B 26/0833 348/E5.142 |
| 6,359,719 B1 * | 3/2002 | Ori | G02B 3/005 349/57 |
| 8,189,263 B1 | 5/2012 | Wang et al. | |
| 8,432,614 B2 | 4/2013 | Amitai | |
| 9,239,453 B2 | 1/2016 | Cheng et al. | |
| 9,341,883 B2 | 5/2016 | Li et al. | |
| 9,664,903 B2 | 5/2017 | An et al. | |
| 2003/0164814 A1 | 9/2003 | Starkweather et al. | |
| 2005/0057793 A1 | 3/2005 | Starkweather et al. | |
| 2006/0250696 A1 | 11/2006 | McGuire | |
| 2007/0171493 A1 | 7/2007 | Nakanishi | |
| 2012/0242916 A1 * | 9/2012 | Sawado | G02F 1/133553 349/9 |
| 2015/0003035 A1 | 1/2015 | Li et al. | |
| 2015/0049390 A1 | 2/2015 | Lanman et al. | |
| 2015/0177519 A1 | 6/2015 | Cakmakci et al. | |
| 2015/0346495 A1 | 12/2015 | Welch et al. | |
| 2016/0070104 A1 | 3/2016 | Yang | |
| 2016/0295202 A1 | 10/2016 | Evans et al. | |
| 2016/0327793 A1 | 11/2016 | Chen et al. | |
| 2017/0235143 A1 | 8/2017 | Chi et al. | |
| 2019/0162950 A1 * | 5/2019 | Lapstun | G02B 6/34 |

FOREIGN PATENT DOCUMENTS

| | | |
|---|---|---|
| CN | 1922539 A | 2/2007 |
| CN | 101943845 A | 1/2011 |
| CN | 103605210 A | 2/2014 |
| CN | 104216042 A | 12/2014 |
| CN | 104251464 A | 12/2014 |
| CN | 104832883 A | 8/2015 |
| CN | 105276479 A | 1/2016 |
| CN | 106033160 A | 10/2016 |
| CN | 106154640 A | 11/2016 |
| CN | 106605171 A | 4/2017 |
| CN | 107305291 A | 10/2017 |

OTHER PUBLICATIONS

Hekun Huang et al., An integral-imaging-based head-mounted light field display using a tunable lens and aperture array, Journal of the SID 25/3, 2017, p. 200-207, Society for Information Display.

Andrew Maimone et al., Holographic Near-Eye Displays for Virtual and Augmented Reality, ACM Transactions on Graphics, vol. 36, No. 4, Article 85. Publication date: Jul. 2017.

David Dunn et al., Membrane AR: Varifocal, Wide Field of View Augmented Reality Display from Deformable Membranes, SIGGRAPH '17 Emerging Technologies, Jul. 30-Aug. 3, 2017, Los Angeles, CA, USA.

Kaan Aksit et al., Varifocal Virtuality: A Novel Optical Layout for Near-Eye Display, SIGGRAPH '17 Emerging Technologies, Jul. 30-Aug. 3, 2017, Los Angeles, CA, USA.

* cited by examiner

DISPLAY DEVICE

CROSS-REFERENCE TO RELATED APPLICATION

THIS APPLICATION CLAIMS THE PRIORITY BENEFIT OF CHINA APPLICATION (CN201810133327.4 FILED ON 2018 Feb. 9). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a display device for displaying 3D image.

BACKGROUND OF THE INVENTION

The light field display device is a display device using light field display technology to produce stereoscopic images. The light field image produces a real image or a virtual image on an imaging surface through a microlens array. Therefore, the observer can see the light field image with depth feeling at a particular distance.

Generally, when people observe the objects within about 10 meters, and the monocular focuses on objects at different distances, there will be accommodation. At this time, both eyes will also rotate on the visual axis at the same time. Therefore, the objects seen by the two eyes will produce parallax and synthesize a stereoscopic image in the brain, which is called "Vergence", that is, non-conjugative movement (opposite movement) of the two eyes in opposite directions. However, the current head-mounted display provides the 2D image, which may result in a situation where the monocular focus is not matched with the binocular focus. This will cause dizziness and discomfort, and produce virtual reality vomiting, this is called vergence-accommodation conflict.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device, which can reduce the thickness and weight of the display device and improve the field of view and the sharpness of the image.

Other objectives and advantages of the invention can be further understood from the technical features disclosed in the invention.

In order to achieve one or a part or all of the above objectives or other objectives, an embodiment of the invention provides a display device, which includes a light source, a light-directing element, a first lens, a microlens array, and a reflective display element. The light source is adapted to provide a lighting beam. The light-directing element is disposed on the transmission path of the lighting beam for projecting the lighting beam toward an incident direction. The first lens is disposed on the transmission path of the lighting beam, and is configured to receive the lighting beam projected by the light-directing element and project the lighting beam toward the incident direction. The microlens array is disposed on the transmission path of the lighting beam, wherein the first lens is located between the microlens array and the light-directing element. The microlens array includes a plurality of microlenses for receiving the lighting beam projected from the first lens. The reflective display element is disposed on the transmission path of the lighting beam, wherein the microlens array is located between the reflective display element and the first lens. The reflective display element includes a plurality of micro-image units, and the micro-image units correspond to the microlenses respectively. The reflective display element is configured to receive the lighting beam projected from the microlens array. Each micro-image unit converts the lighting beam into an sub-image beam and reflect the sub-image beam to the microlens array, and each sub-image beam is projected to the first lens by the corresponding microlens. The first lens converges the sub-image beams and projects the sub-image beams to the light-directing element, and the sub-image beams pass through the light-directing element and transmit to an aperture to form an image beam.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
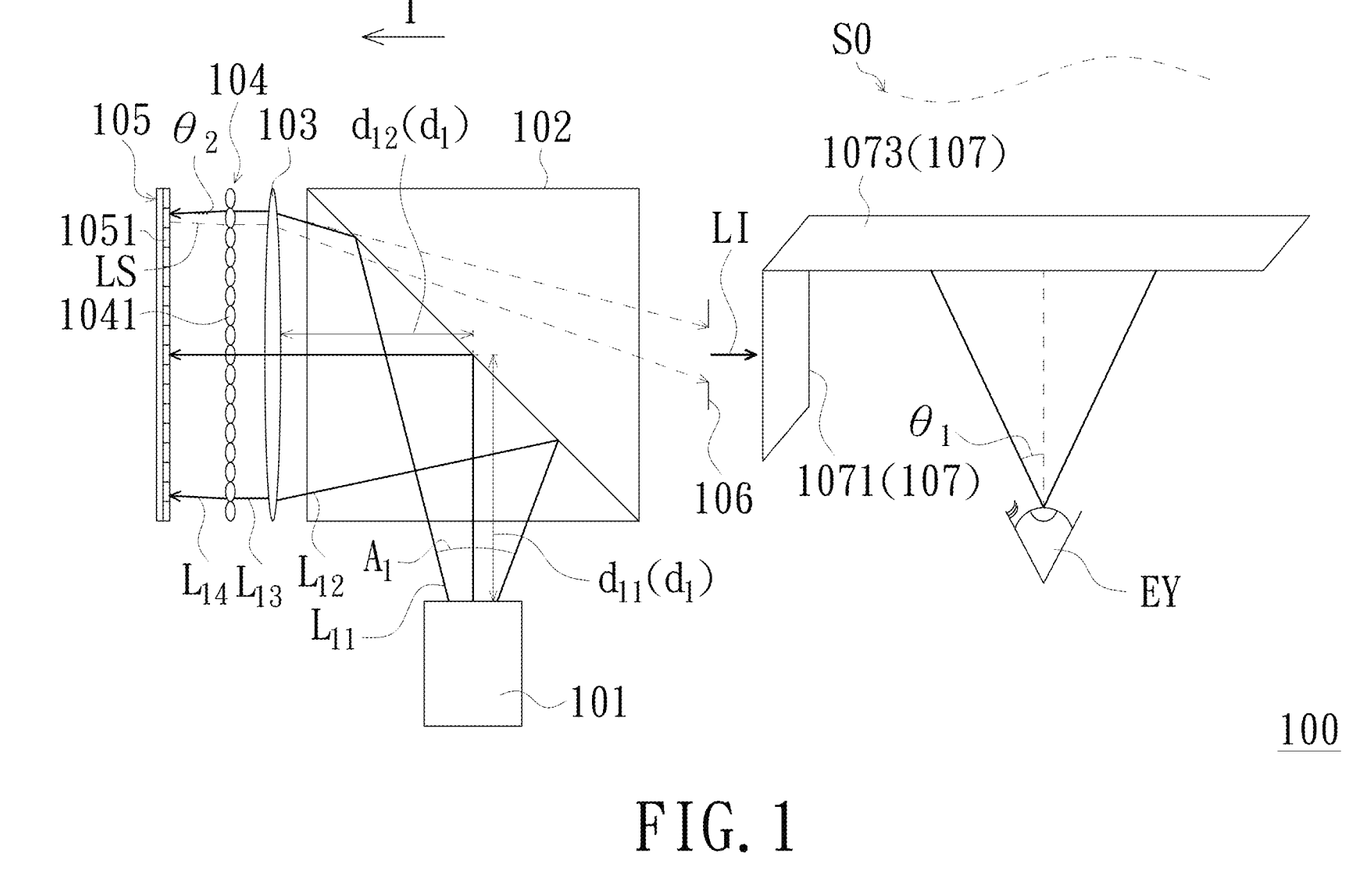
FIG. 1 is a schematic view of a display device in accordance with an embodiment of the invention.

FIG. 1 is a schematic view of a display device in accordance with an embodiment of the invention. Referring to FIG. 1, the display device 100 of the embodiment includes a light source 101, a light-directing element 102, a first lens 103, a microlens array 104, and a reflective display element 105. The light source 101 is adapted to provide a lighting beam $L_{11}$. The light-directing element 102 is disposed on the transmission path of the lighting beam $L_{11}$ for projecting the lighting beam $L_{11}$ toward an incident direction I to become the lighting beam $L_{12}$. The first lens 103 is disposed on the transmission path of the lighting beam $L_{12}$, and is configured to receive the lighting beam $L_{12}$ projected by the light-directing element 102 and project the lighting beam $L_{12}$ toward the incident direction I to become the lighting beam $L_{13}$. The microlens array 104 is disposed on the transmission path of the lighting beam $L_{13}$, wherein the first lens 103 is located between the microlens array 104 and the light-directing element 102. The microlens array 104 includes a plurality of microlenses 1041 for receiving the lighting beam $L_{13}$ projected from the first lens 103 and projecting the lighting beam $L_{14}$ toward the incident direction I. The reflective display element 105 is disposed on the transmission path of the lighting beam $L_{14}$, wherein the microlens array 104 is located between the reflective display element 105 and the first lens 103.

The reflective display element 105 includes a plurality of micro-image units 1051, and the micro-image units 1051 correspond to the microlenses 1041, respectively. The reflective display element 105 is configured to receive the lighting beam $L_{14}$ projected from the microlens array 104, wherein each micro-image unit 1051 converts the lighting beam $L_{14}$ into an sub-image beam LS, and the reflective display element 105 reflects the sub-image beams LS to the microlens array 104 (FIG. 1 shows the sub-image beam LS emitted by the micro-image unit 1051 at the top edge of the reflective display element 105). Each sub-image beam LS is projected to the first lens 103 by the corresponding microlens 1041, and the first lens 103 converges the sub-image beams LS and projects the sub-image beams LS to the light-directing element 102. The sub-image beams LS pass through the light-directing element 102 and transmit to an aperture 106 to form an image beam LI.

In addition, the display device 100 could further include an optical waveguide element 107. In the embodiment, the first lens 103 is configured to collect the sub-image beams LS projected by the microlenses 1041, and converge the sub-image beams LS to the aperture 106. The sub-image beams LS become the image beam LI at the position of aperture 106, and the optical waveguide element 107 is located on the transmission path of the image beam LI for transmitting the image beam LI to the eye EY of the user. In the embodiment, the eye EY of the user can see a virtual image S0, and the user can see the virtual image with the depth feeling. In this embodiment, the optical waveguide element 107 includes optical waveguide elements 1071 and 1073 as an example, but the invention does not limit the number of optical waveguide elements, and one optical waveguide element could also achieve the effects of the invention. As long as the optical waveguide element 107 is located on the transmission path of the image beam LI and the optical waveguide element 107 can transmit the image beam LI to the eye EY of the user. By setting the optical waveguide element 107, the display device 100 of the embodiment, for example, could be applied to augmented reality or virtual reality. The display device 100 of the embodiment may be a light-field display or a near-eye display, to which the invention is not limited.

In the embodiment, the reflective display element 105 is exemplified by the LCoS (Liquid Crystal On Silicon), and the reflective display element 105 is configured to convert the lighting beam $L_{14}$ into a plurality of sub-image beams LS. The plurality of micro-image units 1051 of the reflective display element 105 are composed of a plurality of liquid crystal cells, to which the invention is not limited. The reflective display element may be also a DMD (Digital Micromirror Device), and the plurality of micro-image units may be composed of a plurality of micro-mirrors. In the embodiment, the light-directing element 102 is exemplified by a partially penetrating partially reflecting element. The light-directing element 102 is, for example, a light splitter, or the light-directing element 102, for example, has a metal grating layer that allows 50% of incident light beam to pass through and 50% of incident light beam to reflect. Therefore, the light-directing element 102 can project the partial lighting beam $L_{11}$ toward the incident direction I to become the lighting beam $L_{12}$. The light-directing element 102 allows the sub-image beams LS to pass through and transmit to the aperture 106. However, the invention does not limit the kind or form of the reflective display element 105 and the light-directing element 102. As long as the light-directing element 102 can project the lighting beam $L_{11}$ toward the incident direction I and allow the sub-image beams LS to pass through, and the reflective display element 105 can convert the lighting beam $L_{14}$ into a plurality of sub-image beams LS.

In detail, the lighting beam $L_{11}$ provided by the light source 101 has a divergence angle A1, so that the lighting beam $L_{13}$ converged by the first lens 103 and projected toward the incident direction I becomes a collimated light beam. Since the lighting beam $L_{13}$ is a collimated light beam, the divergence angle of each sub-image beam LS reflected by each micro-image unit 1051 can be controlled within a specific angle range, and the sharpness of the image beam LI can be improved. Specifically, the transmission distance of the lighting beam $L_{11}$ is the distance $d_{11}$ from the light source 101 to the reflective interface of the light-directing element 102, the transmission distance of the lighting beam $L_{12}$ is the distance $d_{12}$ from the reflective interface of the light-directing element 102 to the first lens 103, and the length d1 (ie, $d_{11}+d_{12}$) of the paths of the lighting beams $L_{11}$ and $L_{12}$ from the light source 101 to the first lens 103 is a preset length. By adjusting the preset length, the lighting beam $L_{12}$ can be projected by the first lens 103 toward the incident direction I to become a collimated light beam (ie, the lighting beam $L_{13}$). In addition, there is a spacing distance between the first lens 103 and the microlens array 104, and the spacing distance is substantially the focal length of the microlens array 104, that is, the first lens 103 is disposed at the focal point of the microlens array 104.

Incidentally, the light source 101, for example, could be a laser light source, a light-emitting diode (LED) light source, a micro light-emitting diode light source, or an organic light-emitting diode (OLED) light source, to which the invention does not limit the kind or type of light source 101.

In the embodiment, the aperture 106 is defined as the position where the sub-image beams LS converged, that is, the position of the image beam LI formed. The position of the aperture 106 is at the focal point of the first lens 103. The image beam at the aperture 106 that the sub-image beams LS converged has the smallest image beam cross-sectional area and forms the image beam LI. It is worth mentioning that the invention constitutes a telecentric optical architecture. The microlens array 104 includes a micro-aperture array, the micro-aperture array is disposed in the vicinity of the focal point of the microlens array 104, and the detailed description will be presented later in the specification. In the embodiment, no physical aperture device is provided at the focal point of the first lens 103, to which the invention is not limited. In other embodiments of the invention, the aperture 106 could be a physical aperture, such as a shield sheet with an opening. The physical aperture can effectively block the stray light around the image beam LI, and reduce the ghost image and/or stray light generated when the eye EY of the user views the image beam LI.

Figure 2A:
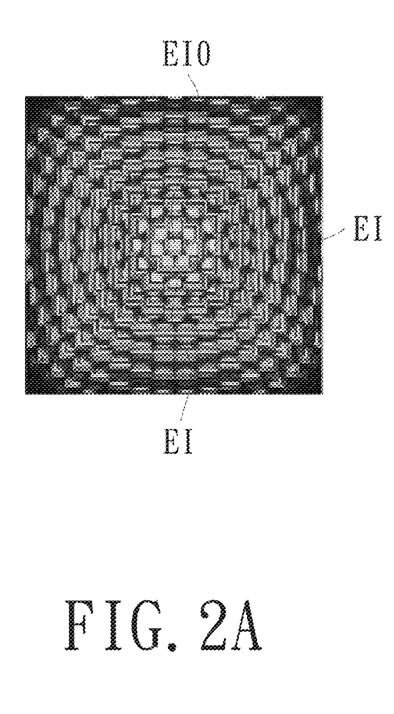
FIG. 2A is a schematic view of a plurality of sub-images respectively displayed by a plurality of micro-image units of a reflective display element of the display device in the embodiment shown in FIG. 1.
Figure 2B:
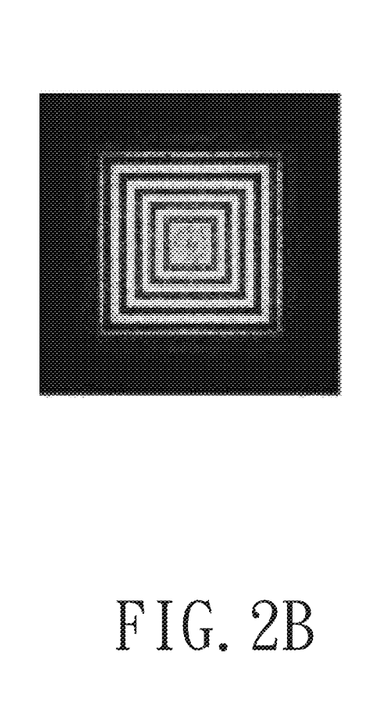
FIG. 2B is a schematic view of an image observed by the eye of the user through the display device of the embodiment shown in FIG. 1.

Referring to FIGS. 2A and 2B. FIG. 2A is a schematic view of a plurality of sub-images respectively displayed by a plurality of micro-image units 1051 of the reflective display element 105 of the display device 100 in the embodiment shown in FIG. 1. FIG. 2B is a schematic view of an image observed by the eye EY of the user through the display device 100 of the embodiment shown in FIG. 1. The sub-images EI0 and EI shown in FIG. 2A are an example of the sub-image beams LS provided by the micro-image units 1051 of the reflective display element 105. As shown in FIG. 2A, in the embodiment, a plurality of the micro-image units 1051 display one sub-image EI0 and a plurality of sub-images EI, wherein the sub-image EI0 is defined as a central sub-image and the sub-images EI surround the central sub-image (i.e., sub-image EI0). In the embodiment, the sub-images EI0 and EI are projected to the first lens 103 via the corresponding microlenses 1041, sequentially transmitted through the light-directing element 102 and the aperture 106, and then transmitted to the eye EY of the user through the optical waveguide element 107, so that the user can view the image shown in FIG. 2B. Thus, the display device 100 of the embodiment enables the user to view the image with depth perception through the arrangement of the light source 101, the light-directing element 102, the first lens 103, the microlens array 104, the reflective display element 105, the aperture 106, and the optical waveguide element 107. However, the sub-images EI0 and EI generated by the reflective display element 105 in FIG. 2A are merely examples, to which the invention is not limited.

Figure 3:
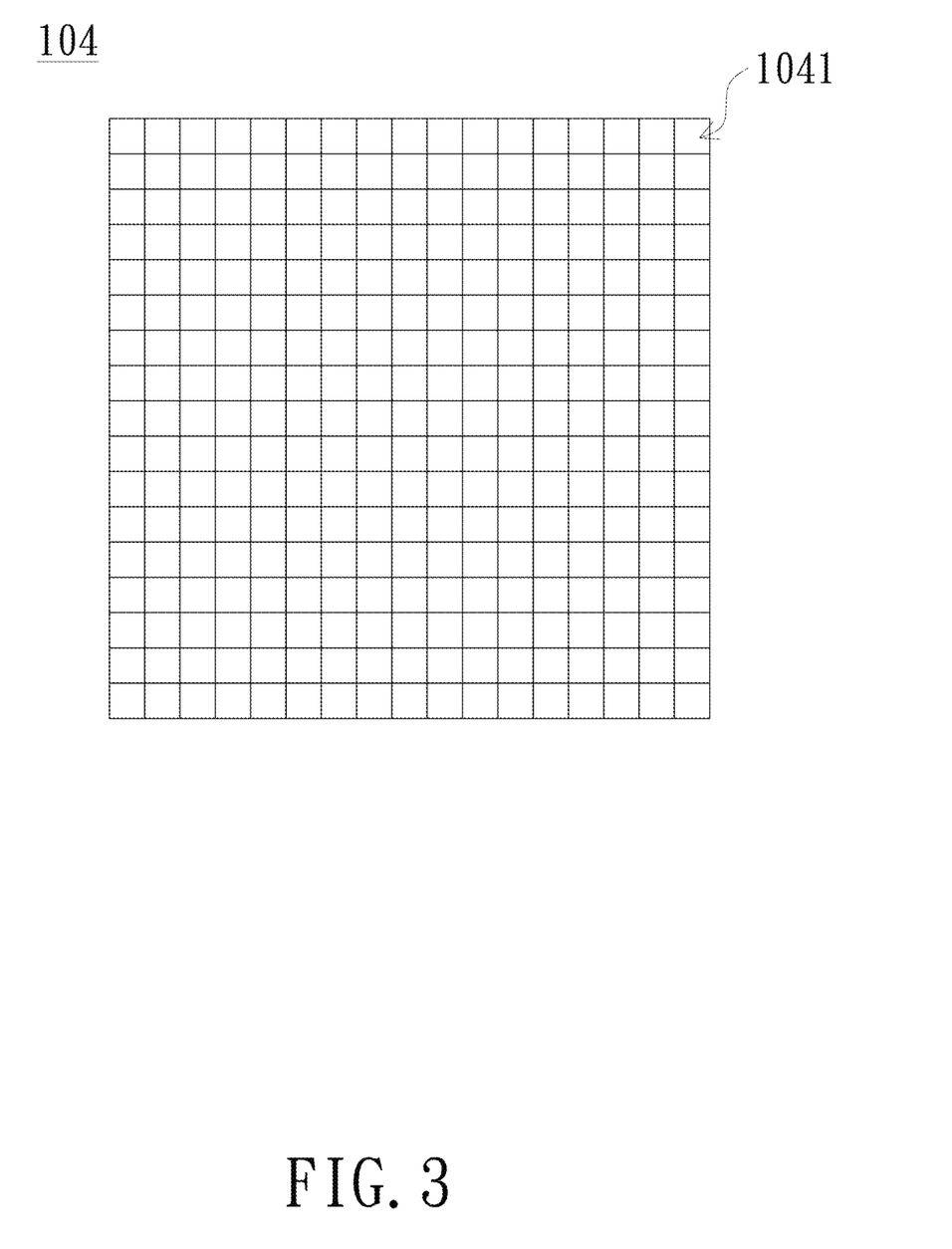
FIG. 3 is a schematic view of a microlens array of the display device of the embodiment shown in FIG. 1.

FIG. 3 is a schematic view of the microlens array 104 of the display device 100 of the embodiment shown in FIG. 1. Referring to FIG. 3, in the embodiment, the microlenses 1041 of the microlens array 104 are arranged in a matrix manner for the exemplary description, to which the invention is not limited. In the embodiment, the focal length of each microlens 1041 is the same for example. However, in other embodiments, the focal lengths of the microlenses 1041 could be different. In the front view, the shape of the microlenses 1041 are, for example, a rectangle, but in the lateral view, the shape of the microlenses 1041 are the lens shape having curved surfaces.

In the embodiment of FIG. 1, the setting of the light-directing element 102 can simplify the light path and structure of the display device 100 and significantly reduce its thickness and weight. Also, since the sub-image beam LS can be deflected at a large angle by the first lens 103, the incident angle θ1 entering the eye EY of the user after passing through the optical waveguide element 107 will be much greater than the outgoing angle θ2 of the sub-image beam LS exiting the micro-image unit 1051. Therefore, the overall thickness of the display device 100 does not need to be too thick to achieve the advantage of a large field of view (FOV). In addition, since the sub-image beam LS can be deflected at a large angle by the first lens 103, the microlenses 1041 of the microlens array 104 do not need to adopt a special design of the inclined optical surfaces, which can reduce the cost and simplify the structure of the display device 100.

In the embodiment, the lighting beam $L_{14}$ projected by each microlens 1041 to the corresponding micro-image unit 1051 has a predetermined incident angle, so that the sub-image beam LS reflected by the micro-image unit 1051 does not project out of the corresponding microlens 1041. The predetermined incident angle can be represented by θ2 shown in FIG. 1. By controlling the lighting beam $L_{14}$ entering the micro-image unit 1051 to have the predetermined incident angle, each micro-image unit 1051 can only partially convert the lighting beam $L_{14}$, so that the reflected sub-image beam LS does not project out of the corresponding microlens 1041 and the sharpness of the image displayed by the display device 100 can be improved. The invention does not limit the method for controlling the lighting beam $L_{14}$ entering the micro-image unit 1051 to have the predetermined incident angle, as long as the lighting beam $L_{14}$ projected by the microlens 1041 have the predetermined incident angle. The predetermined incident angle could be ±12 degrees, to which the invention is not limited. For example, one of the following methods may be applied: adjusting the divergence angle A1 of the lighting beam $L_{11}$ provided by the light source 101, adjusting the focal length of the first lens 103, adjusting the focal length of each microlens 1041 and/or adjusting the distance between the light source 101, the light-directing element 102, the first lens 103, the microlens array 104 and the reflective display element 105 to make the lighting beam $L_{14}$ projected from the microlens 1041 has the predetermined incident angle.

Figure 4:
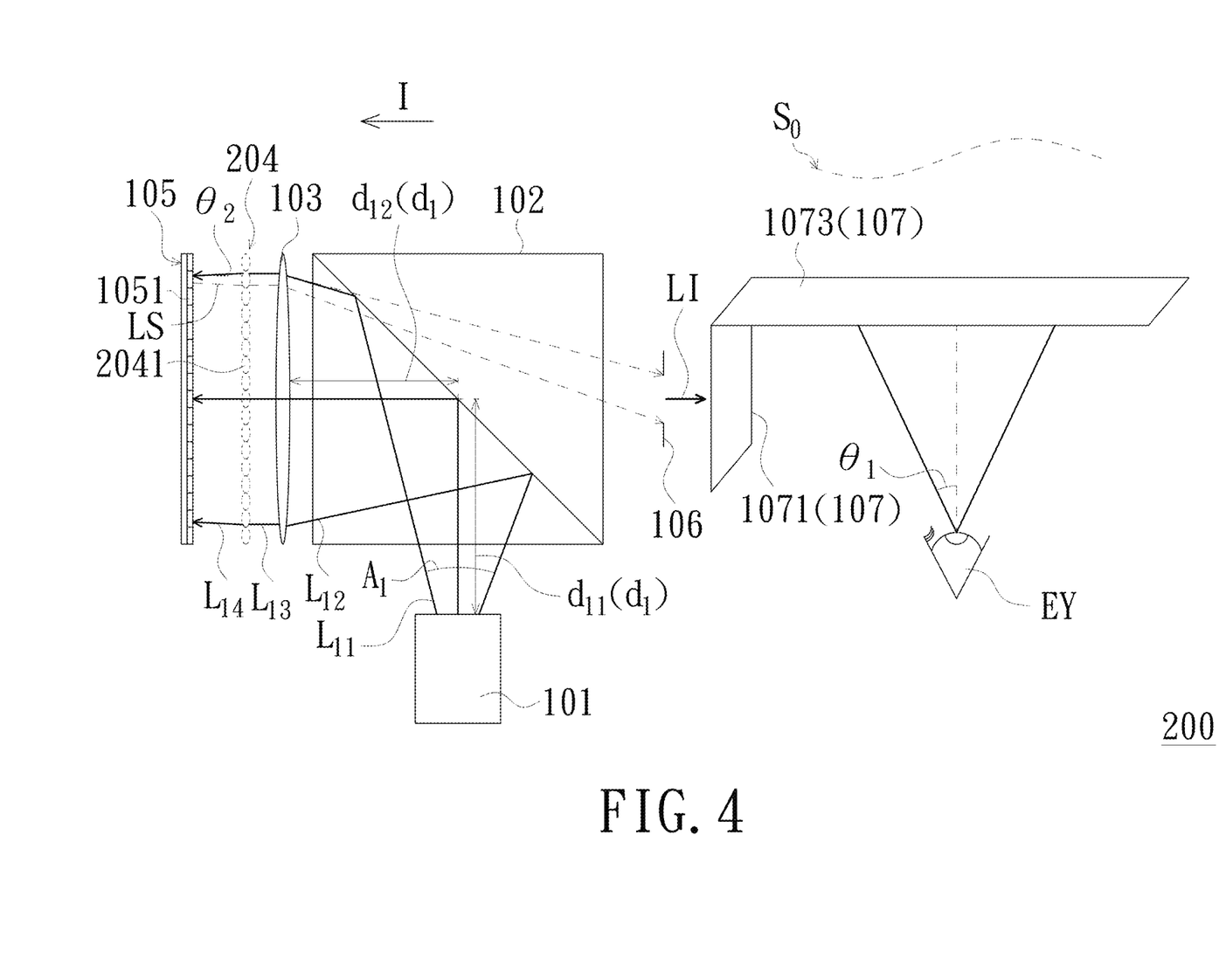
FIG. 4 is a schematic view of a display device in accordance with another embodiment of the invention.

FIG. 4 is a schematic view of a display device in accordance with another embodiment of the invention. Referring to FIG. 4, in the embodiment, the display device 200 includes a light source 101, a light-directing element 102, a first lens 103, a microlens array 204, a reflective display element 105, and an optical waveguide element 107. The display device 200 of the embodiment has a similar structure and function as the display device 100 shown in FIG. 1. The embodiment shown in FIG. 4 is different from the embodiment shown in FIG. 1 in that the microlens array 204, for example, is a spatial light modulator (SLM), and the microlenses 2041 have variable focal lengths, that is, each microlens 2041 of the microlens array 204 of the embodiment can adjust its focal length. In the embodiment, each microlens 2041, for example, could be implemented by a liquid crystal light valve (LCLV), a liquid lens, a liquid crystal lens, or other focal length adjustable optical elements.

Figure 5:
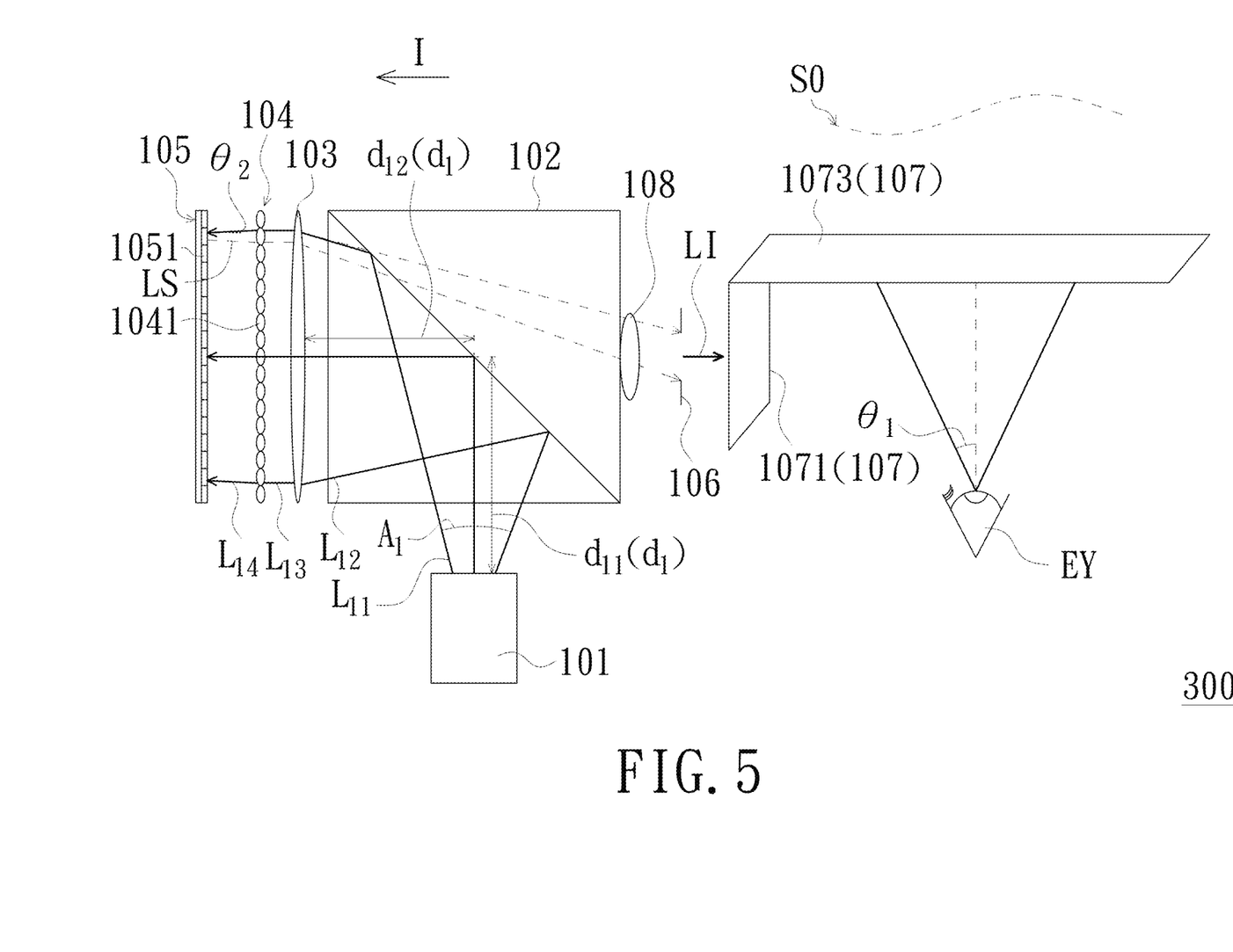
FIG. 5 is a schematic view of a display device in accordance with still another embodiment of the invention.

FIG. 5 is a schematic view of a display device in accordance with still another embodiment of the invention. Referring to FIG. 5, in the embodiment, the display device 300 includes a light source 101, a light-directing element 102, a first lens 103, a microlens array 104, a reflective display element 105, a second lens 108, and an optical waveguide element 107. The display device 300 of the embodiment has a similar structure and function as the display device 100 shown in FIG. 1. The embodiment shown in FIG. 5 is different from the embodiment shown in FIG. 1 in that the display device 300 further includes a second lens 108 disposed on one side of the light-directing element 102, wherein the second lens 108 is located between the light-directing element 102 and the aperture 106. The second lens 108 is adapted to project the sub-image beams LS penetrating the light-directing element 102 to the aperture 106. With the setting of the second lens 108, the field of view of the display device 300 can be increased, and the aberration can be reduced, thereby further enhancing the display performance of the display device 300.

Figure 6:
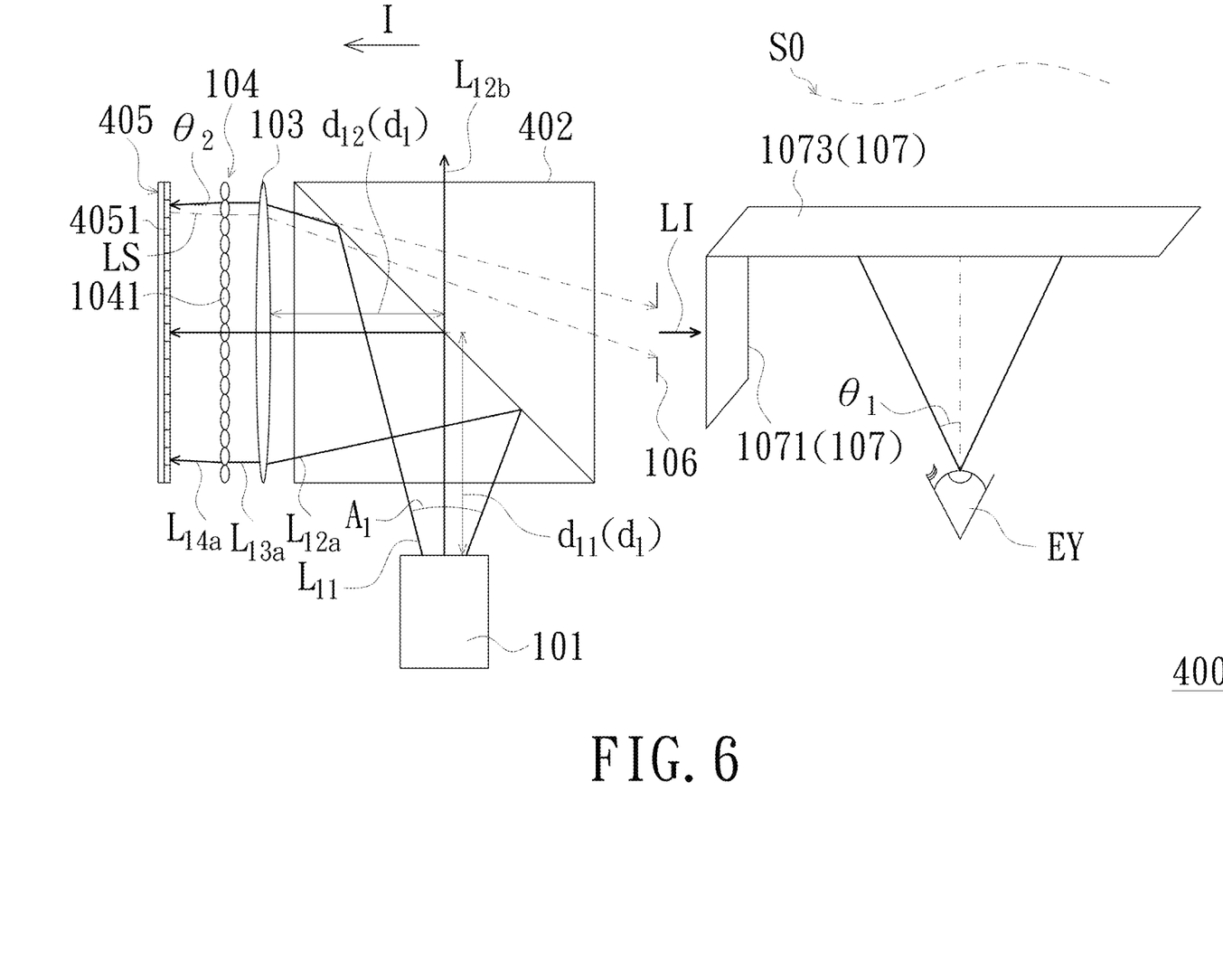
FIG. 6 is a schematic view of a display device in accordance with still another embodiment of the invention.

FIG. 6 is a schematic view of a display device in accordance with still another embodiment of the invention. Referring to FIG. 6, in the embodiment, the display device 400 includes a light source 101, a light-directing element 402, a first lens 103, a microlens array 104, a reflective display element 405, and an optical waveguide element 107. The display device 400 of the embodiment has a similar structure and function as the display device 100 shown in FIG. 1. The embodiment shown in FIG. 6 is different from the embodiment shown in FIG. 1 in that the reflective display element 405 is a liquid crystal on silicon (LCoS) display device, and the light-directing element 402 is a polarizing beam splitter (PBS). The lighting beam $L_{11}$ includes a first polarized light beam and a second polarized light beam, the light-directing element 402 reflects the first polarized light beam of the lighting beam $L_{11}$ toward the incident direction I, and becoming the lighting beam $L_{12a}$. The light-directing element 402 lets the second polarized light beam of the lighting beam $L_{11}$ to pass through, and becoming the lighting beam $L_{12b}$. The polarization states of the first polarized light beam (the lighting beam $L_{12a}$) and the second polarized light beam (the lighting beam $L_{12b}$) are perpendicular to each other.

The first lens 103 projects the lighting beam $L_{12a}$ toward the incident direction I to become the lighting beam $L_{13a}$. The microlens array 104 receives the lighting beam $L_{13a}$ projected from the first lens 103, and projects the lighting beam $L_{14a}$ toward the incident direction I. After the micro-image units 4051 of the reflective display element 405 convert the lighting beam $L_{14a}$ into the sub-image beams LS, the polarization state of the sub-image beams LS reflected will be changed, so that the sub-image beams LS reflected have the same polarization state as the second polarized light beam. Therefore, when the first lens 103 projects the sub-image beams LS to the light-directing element 402, the sub-image beams LS can pass through the light-directing element 402 and converge to the aperture 106. Therefore, the image display can be realized by the reflective LCoS display element 405 in this embodiment.

Figure 7:
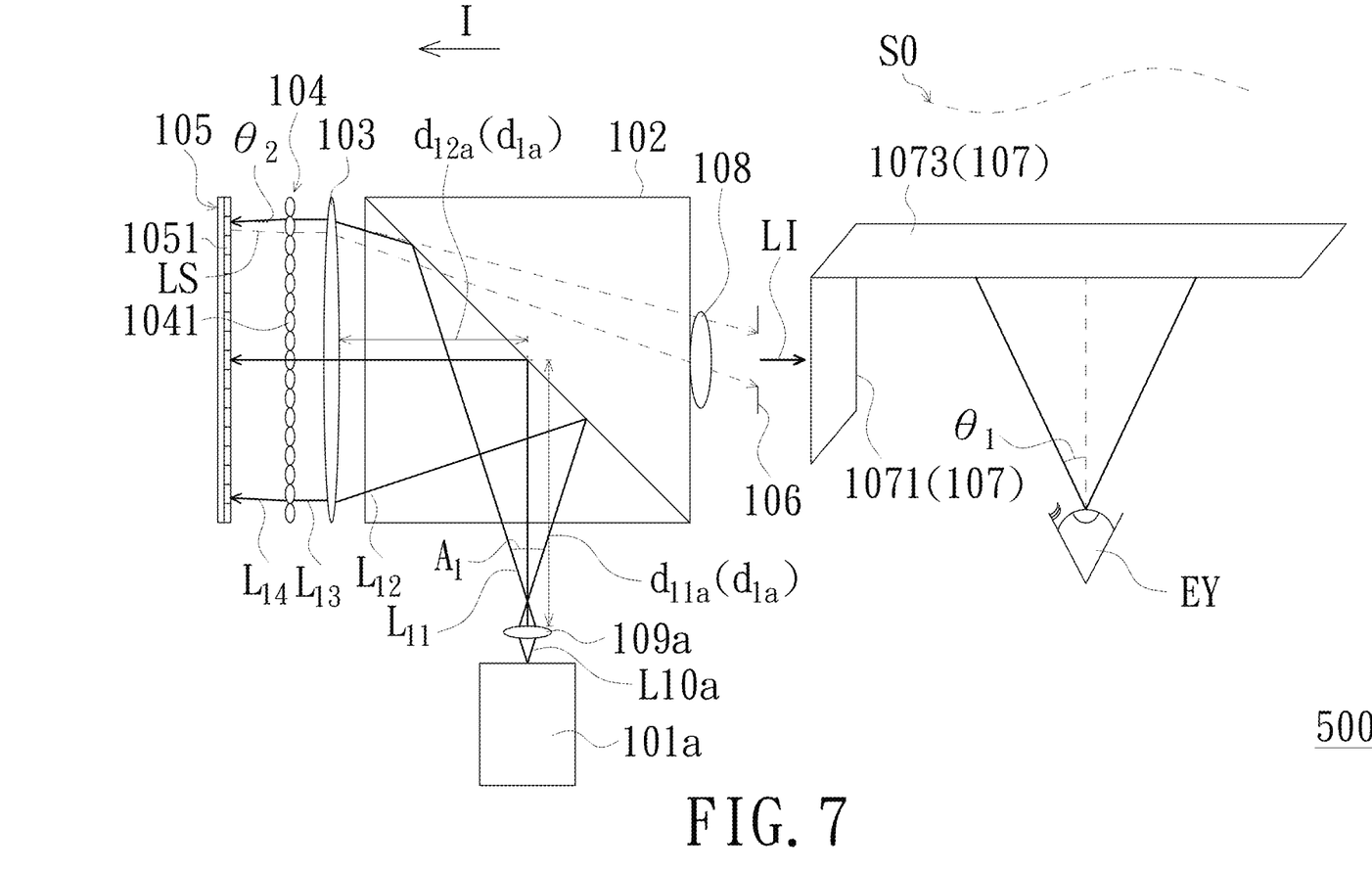
FIG. 7 is a schematic view of a display device in accordance with still another embodiment of the invention.

FIG. 7 is a schematic view of a display device in accordance with still another embodiment of the invention. Referring to FIG. 7, in the embodiment, the display device 500 includes a light source 101a, a light source lens 109a, a light-directing element 102, a first lens 103, a microlens array 104, a reflective display element 105, and an optical waveguide element 107. The display device 500 of the embodiment has a similar structure and function as the display device 100 shown in FIG. 1. The embodiment shown in FIG. 7 is different from the embodiment shown in FIG. 1 in that the light source lens 109a is disposed between the light source 101a and the light-directing element 102. The focal length of the light source lens 109a is positive, so that the lighting beam $L_{10a}$ provided by the light source 101a has a divergence angle A1 after penetrating the light source lens 109a, and becoming the lighting beam $L_{11}$, so that the lighting beam $L_{12}$ projected toward the incident direction I by the first lens 103 becomes a collimated light beam (ie, the lighting beam $L_{13}$).

In detail, the length $d_{1a}$ (ie, $d_{11a}+d_{12a}$) of the path of the lighting beam from the light source lens 109a to the first lens 103 is a preset length. By adjusting the preset length, the lighting beam $L_{12}$ can be projected by the first lens 103 toward the incident direction I to become a collimated light beam (ie, the lighting beam $L_{13}$).

Figure 8:
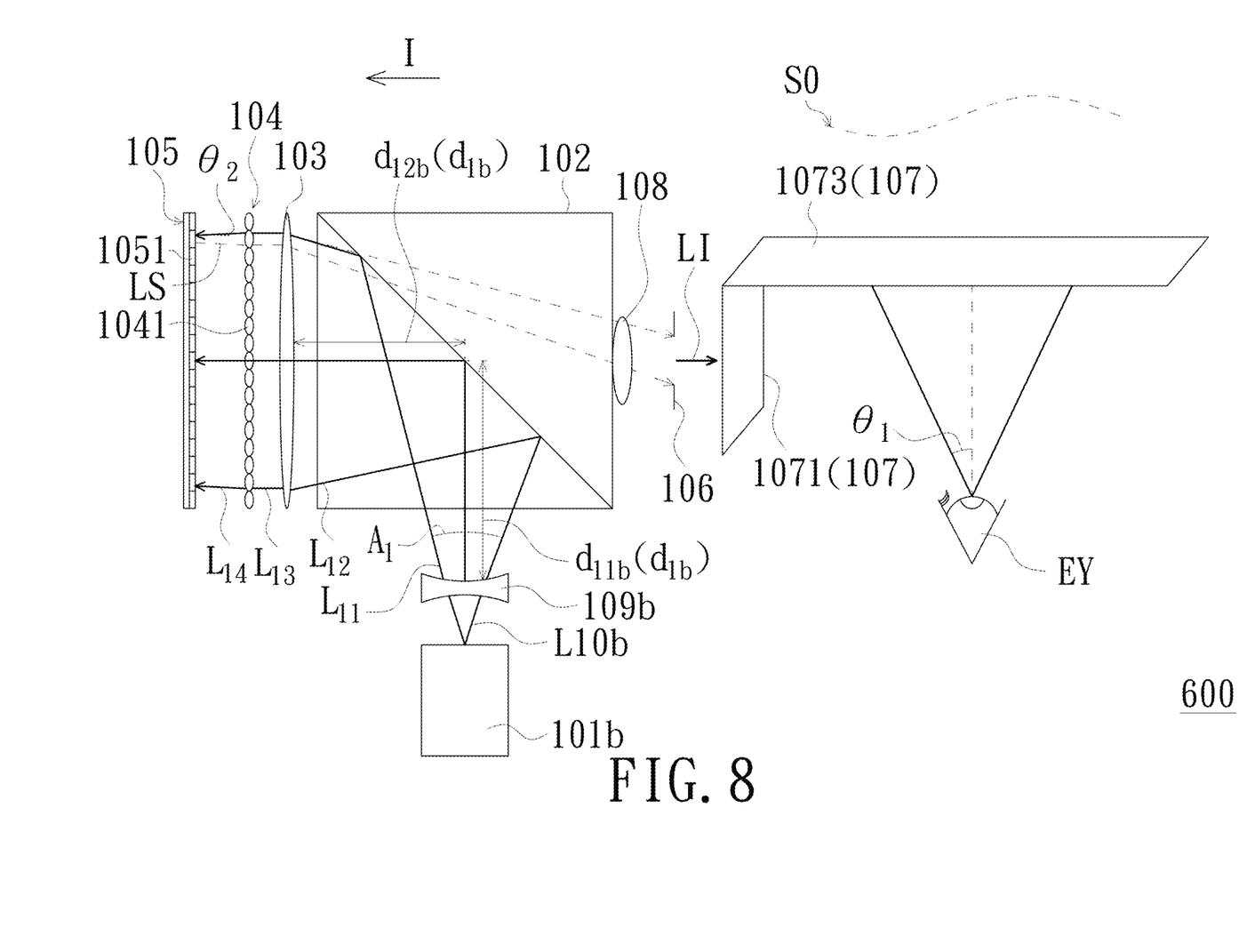
FIG. 8 is a schematic view of a display device in accordance with still another embodiment of the invention.

FIG. 8 is a schematic view of a display device in accordance with still another embodiment of the invention. Referring to FIG. 8, in the embodiment, the display device 600 includes a light source 101b, a light source lens 109b, a light-directing element 102, a first lens 103, a microlens array 104, a reflective display element 105, and an optical waveguide element 107. The display device 600 of the embodiment has a similar structure and function as the display device 100 shown in FIG. 1. The embodiment shown in FIG. 8 is different from the embodiment shown in FIG. 1 in that the light source lens 109b is disposed between the light source 101b and the light-directing element 102. The focal length of the light source lens 109b is negative, so that the lighting beam $L_{10b}$ provided by the light source 101b has a divergence angle A1 after penetrating the light source lens 109b, and becoming the lighting beam $L_{11}$, so that the lighting beam $L_{12}$ projected toward the incident direction I by the first lens 103 becomes a collimated light beam (ie, the lighting beam $L_{13}$).

In detail, the length $d_{1b}$ (ie, $d_{11b}+d_{12b}$) of the path of the lighting beam from the light source lens 109b to the first lens 103 is a preset length. By adjusting the preset length, the lighting beam $L_{12}$ can be projected by the first lens 103 toward the incident direction I to become a collimated light beam (ie, the lighting beam $L_{13}$).

Figure 9:
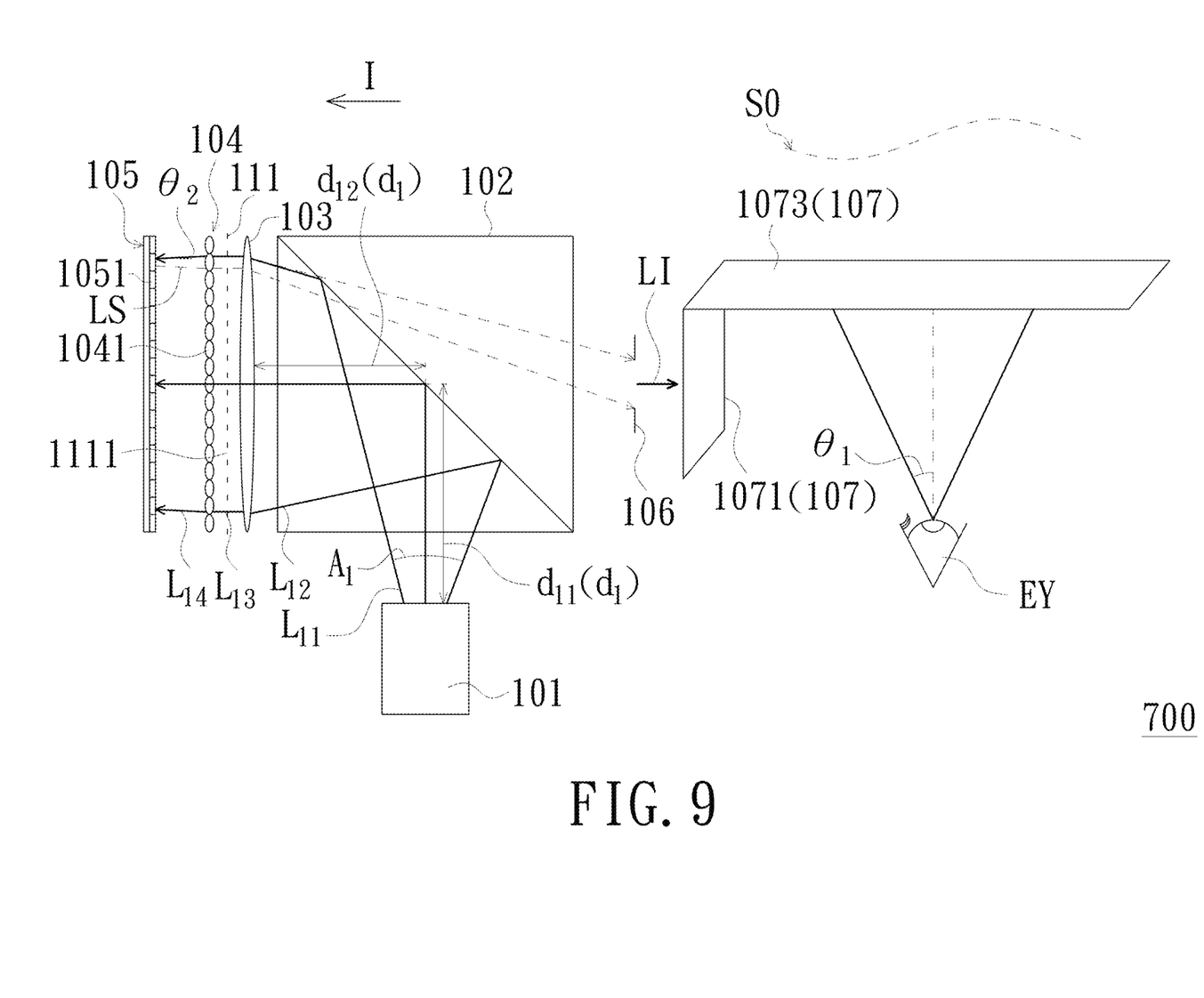
FIG. 9 is a schematic view of a display device in accordance with still another embodiment of the invention.

FIG. 9 is a schematic view of a display device in accordance with still another embodiment of the invention. Referring to FIG. 9, in the embodiment, the display device 700 includes a light source 101, a light-directing element 102, a first lens 103, a microlens array 104, a reflective display element 105, and an optical waveguide element 107. The display device 700 of the embodiment has a similar structure and function as the display device 100 shown in FIG. 1. The embodiment shown in FIG. 9 is different from the embodiment shown in FIG. 1 in that the microlens array 104 further includes a micro-aperture array 111 disposed on one side of the first lens 103 and located between the first lens 103 and the microlens array 104. The micro-aperture array 111 includes a plurality of micro-apertures 1111, and the micro-apertures 1111 correspond to the microlenses 1041, respectively. The position of each micro-aperture 1111 is at the focal point of the corresponding microlens 1041 to constitute a telecentric optical architecture.

In the embodiment, the micro-aperture array 111, for example, may be a virtual aperture array, and the micro-aperture array 111 may also be disposed on the first lens 103, to which the invention is not limited. In other embodiments, the micro-aperture array 111 could be a physical micro-aperture array device, and the physical micro-aperture array 111 can reduce stray light.

Figure 10A:
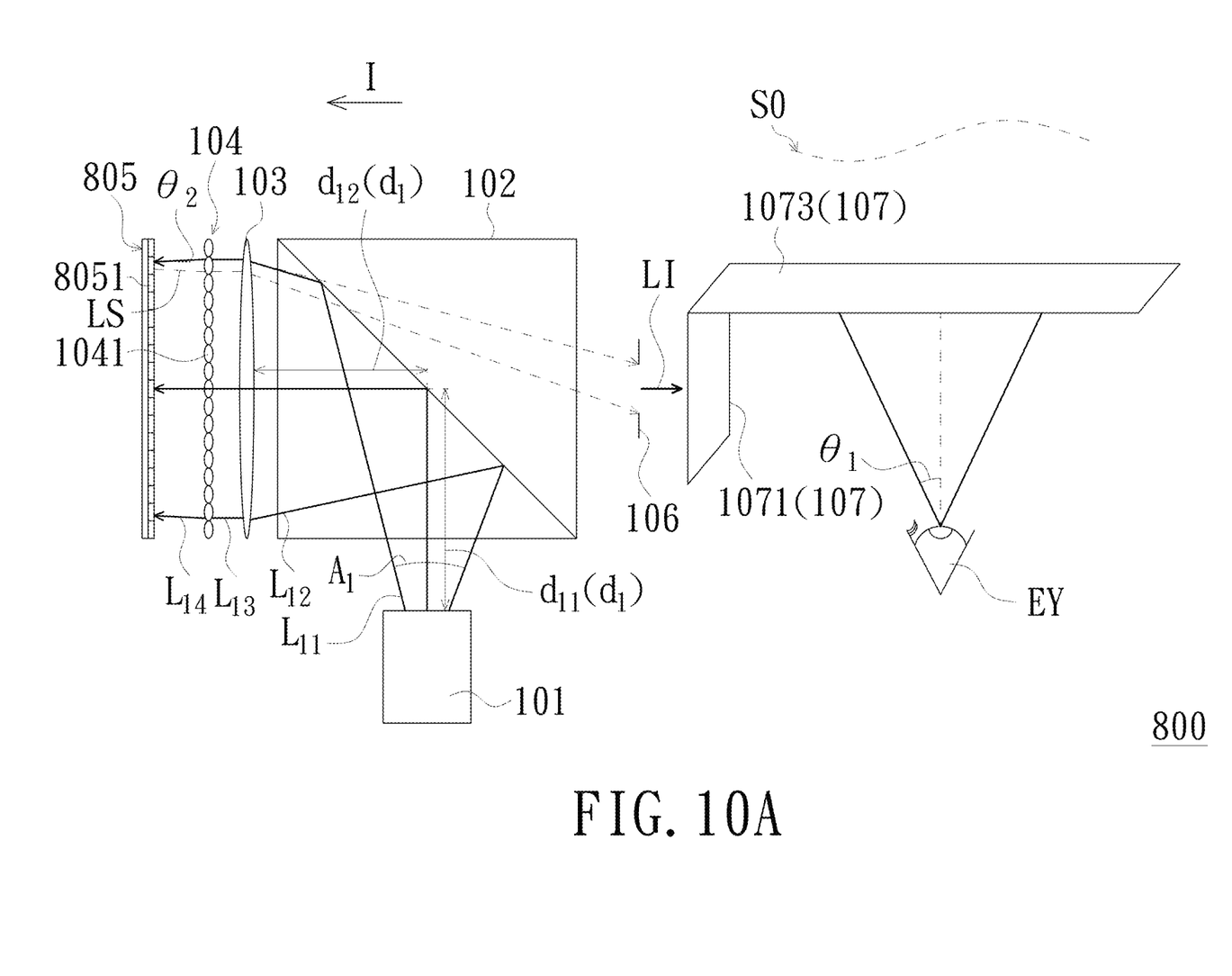
FIG. 10A is a schematic view of a display device in accordance with still another embodiment of the invention.
Figure 10B:
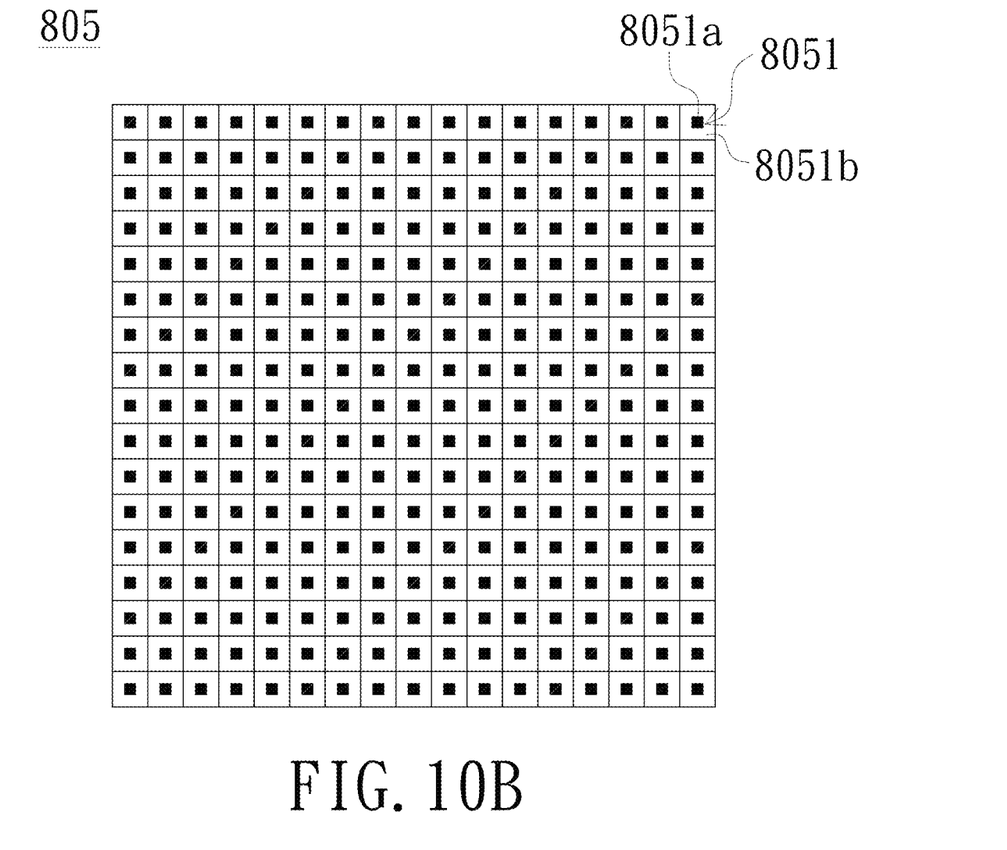
FIG. 10B is a schematic view of a reflective display element in accordance with still another embodiment of the invention.

FIG. 10A is a schematic view of a display device in accordance with still another embodiment of the invention, and FIG. 10B is a schematic view of a reflective display element in accordance with still another embodiment of the invention. Referring to FIG. 10A, in the embodiment, the display device 800 includes a light source 101, a light-directing element 102, a first lens 103, a microlens array 104, a reflective display element 805, and an optical waveguide element 107. The display device 800 of the embodiment has a similar structure and function as the display device 100 shown in FIG. 1. The embodiment shown in FIG. 10A and FIG. 10B is different from the embodiment shown in FIG. 1 in that in the reflective display element 805, each micro-image unit 8051 includes an effective display area 8051a and a non-effective display area 8051b (as shown in FIG. 10B).

Figure 10C:
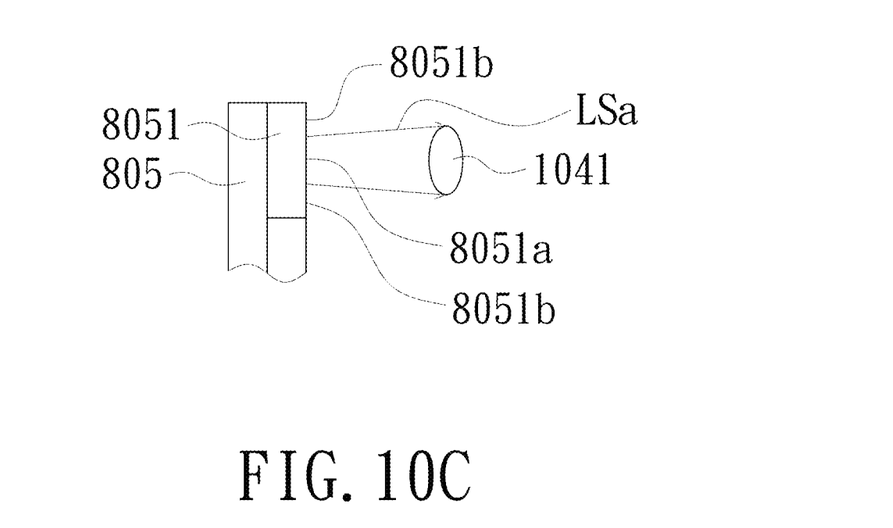
FIG. 10C is a partial schematic view of a display device in accordance with still another embodiment of the invention.

FIG. 10C is a schematic view of the sub-image beam LSa emitted from the micro-image unit 8051 located on the upper edge of the reflective display element 805 in the display device 800 shown in FIG. 10A. Referring to FIG. 10C, after the reflective display element 805 receives the lighting beam $L_{14}$ projected by the microlens array 104, the non-effective display area 8051b does not reflect the lighting beam $L_{14}$, only the effective display area 8051a reflects the lighting beam $L_{14}$ to generate the sub-image beam LSa and project the sub-image beam LSa to the corresponding microlens 1041. The effective display area 8051a, for example, could be located in the central area of the micro-image unit 8051, so that the sub-image beam LSa reflected does not project out of the corresponding microlens 1041. By controlling the reflective display element 805, each micro-image unit 8051 converts only part of the lighting beam $L_{14}$, so that the sub-image beam LSa reflected does not project out of the corresponding microlens 1041, which can improve the sharpness of the image.

In summary, according to the display device of the embodiment of the invention, by disposing a light-directing element and a first lens, the thickness and weight of the display device can be greatly reduced, the field of view can be improved, and the sharpness of the image can be improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first lens and the second lens are only used for distinguishing various elements and do not limit the number of the elements.

What is claimed is:

1. A display device, comprising a light source, a light-directing element, a first lens, a microlens array, a reflective display element and a light source lens, wherein
   the light source is adapted to provide a lighting beam,
   the light-directing element is disposed on the transmission path of the lighting beam for projecting the lighting beam toward an incident direction,
   the first lens is disposed on the transmission path of the lighting beam, and is configured to receive the lighting beam projected by the light-directing element and project the lighting beam toward the incident direction,
   the microlens array is disposed on the transmission path of the lighting beam, wherein the first lens is located between the microlens array and the light-directing element, and the microlens array comprises a plurality of microlenses for receiving the lighting beam projected from the first lens, the reflective display element is disposed on the transmission path of the lighting beam, wherein the microlens array is located between the reflective display element and the first lens, the reflective display element comprises a plurality of micro-image units, the micro-image units correspond to the microlenses respectively, the reflective display element is configured to receive the lighting beam projected from the microlens array, the micro-image units convert the lighting beam into sub-image beams and reflect the sub-image beams to the microlens array, the sub-image beams are projected to the first lens by the corresponding microlenses, the first lens converges the sub-image beams and projects the sub-image beams to the light-directing element, and the sub-image beams pass through the light-directing element and transmit to an aperture to form an image beam; and the light source lens is disposed between the light source and the light-directing element, the focal length of the light source lens is positive or negative, so that the lighting beam has a divergence angle after passing through the light source lens, so that the lighting beam projected toward the incident direction by the first lens becomes a collimated light beam.

2. The display device according to claim 1, further comprising at least one optical waveguide element, wherein the sub-image beams pass through the aperture to form the image beam, and the optical waveguide element is located on the transmission path of the image beam.

3. The display device according to claim 1, wherein the lighting beam provided by the light source has a divergence angle, so that the lighting beam projected toward the incident direction by the first lens becomes a collimated light beam.

4. The display device according to claim 3, wherein the length of the path of the lighting beam from the light source to the first lens is a preset length, so that the lighting beam projected toward the incident direction by the first lens becomes the collimated light beam.

5. The display device according to claim 1, wherein the length of the path of the lighting beam from the light source lens to the first lens is a preset length, so that the lighting beam projected toward the incident direction by the first lens becomes the collimated light beam.

6. The display device according to claim 1, wherein the microlens array is a spatial light modulator, and the microlenses have variable focal lengths.

7. The display device according to claim 1, further comprising a second lens disposed on one side of the light-directing element, wherein the second lens is located between the light-directing element and the aperture, and the second lens is adapted to project the sub-image beams passing through the light-directing element to the aperture.

8. The display device according to claim 1, wherein the aperture comprises an aperture device.

9. The display device according to claim 1, wherein the reflective display element is a Liquid crystal on silicon display device.

10. The display device according to claim 9, wherein the light-directing element is a polarization beam splitter, the lighting beam comprises a first polarized light beam and a second polarized light beam, the light-directing element reflects the first polarized light beam toward the incident direction, the light-directing element lets the second polarized light beam to pass through, and the polarization states of the first polarized light beam and the second polarized light beam are perpendicular to each other.

11. The display device according to claim 1, wherein the reflective display element is a Digital Micromirror Device.

12. The display device according to claim 11, wherein the light-directing element is a partially penetrating and partially reflecting element.

13. The display device according to claim 1, wherein the microlens array further comprises a micro-aperture array disposed on one side of the first lens and located between the first lens and the microlens array, the micro-aperture array comprises a plurality of micro-apertures, and the micro-apertures correspond to the microlenses, respectively.

14. The display device according to claim 13, wherein the micro-apertures comprises micro-aperture devices.

15. The display device according to claim 1, wherein the micro-image units comprises an effective display area and a non-effective display area, the non-effective display area does not reflect the lighting beam, the effective display area reflects the lighting beam to project the sub-image beam to the corresponding microlens, the effective display area is located in the central area of the micro-image unit, so that the sub-image beam reflected does not project out of the corresponding microlens.

16. The display device according to claim 1, wherein the lighting beam projected by the microlens to the corresponding micro-image unit has a predetermined incident angle, so that the sub-image beam reflected by the micro-image unit does not project out of the corresponding microlens.

17. The display device according to claim 1, wherein there is a spacing distance between the first lens and the microlens array, and the spacing distance is substantially the focal length of the microlens array.

* * * * *